United States Patent [19]
Xiao et al.

[11] Patent Number: 5,774,360
[45] Date of Patent: Jun. 30, 1998

[54] METHOD OF CORRECTING FORMATION RESISTIVITY WELL LOGS FOR THE EFFECTS OF FORMATION LAYER INCLINATION WITH RESPECT TO THE WELLBORE

[75] Inventors: Jiaqi Xiao, Houston; Qiang Zhou, Missouri City, both of Tex.

[73] Assignee: Western Atlas International, Inc., Houston, Tex.

[21] Appl. No.: 622,365

[22] Filed: Mar. 26, 1996

[51] Int. Cl.$^6$ .................................................. G06F 19/00
[52] U.S. Cl. ........................................................... 702/6
[58] Field of Search ............................... 364/422; 33/302, 33/304, 313; 324/369, 366, 370, 355, 356

[56] References Cited

U.S. PATENT DOCUMENTS

| | | | |
|---|---|---|---|
| 4,482,959 | 11/1984 | Minne | 364/422 |
| 4,484,278 | 11/1984 | Edmundson | 364/422 |
| 4,486,836 | 12/1984 | Lacour-Gayet | 364/422 |
| 4,541,275 | 9/1985 | Kerzner | 364/422 |
| 4,761,889 | 8/1988 | Cobern et al. | 33/302 |
| 4,980,643 | 12/1990 | Gianzero et al. | 324/339 |
| 5,064,006 | 11/1991 | Waters et al. | 324/346 |
| 5,155,916 | 10/1992 | Engebretson | 33/302 |
| 5,184,079 | 2/1993 | Barber | 364/422 |
| 5,321,893 | 6/1994 | Engebretson | 33/304 |
| 5,452,518 | 9/1995 | DiPersio | 33/304 |
| 5,511,037 | 4/1996 | Randall et al. | 364/422 |

OTHER PUBLICATIONS

R.H. Hardman et al., "Theory of Induction Sondes in Dipping Beds", Geophysics, vol. 51, No. 3, pp. 800–809, Society of Exploration Geophysicists, Mar. 1986.

*Primary Examiner*—Donald E. McElheny, Jr.
*Attorney, Agent, or Firm*—Richard A. Fagin

[57] ABSTRACT

A method for correcting response of an induction logging instrument for inclination of earth formations with respect to an axis of the instrument. The instrument has a transmitter and a plurality of receivers at spaced apart locations. The method includes calculating expected receiver responses of simulated media having different conductivities. The calculations are performed for a plurality of different inclinations. The calculations are also performed for media having a plurality of different conductivity contrasts. 2-dimensional filters corresponding to a charge effect portion of each of the expected responses are calculated. 2-dimensional filters corresponding to a volumetric effect portion of each of the expected responses are calculated. An angle of inclination of the earth formations with respect to the instrument is determined. An approximate conductivity contrast of the earth formations is determined. Coefficients are interpolated between the 2-dimensional charge effect filters having simulated inclinations and contrasts closest to the angle of inclination and conductivity contrast of the formations. The interpolated filter coefficients are applied to measured receiver responses, generating charge effect-filtered measured responses. Coefficients are interpolated between the 2-dimensional volumetric effect filters having simulated inclinations and conductivity contrasts closest to the angle of inclination and conductivity contrast of the formations. The interpolated coefficients are applied to the charge effect-filtered measured responses to calculate corrected receiver responses.

13 Claims, 16 Drawing Sheets

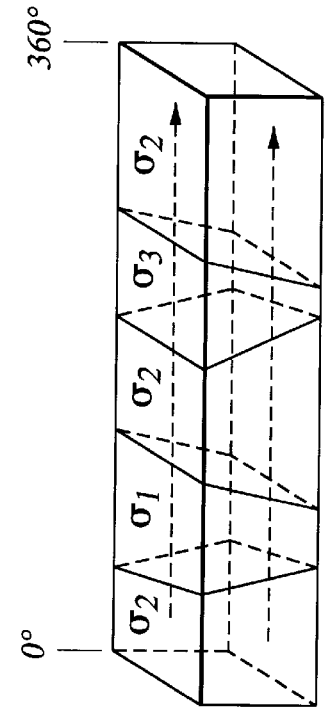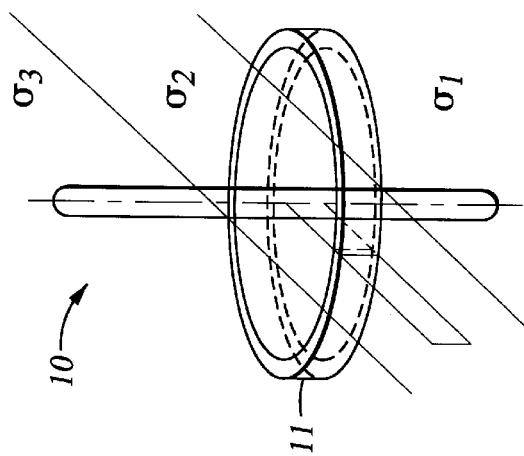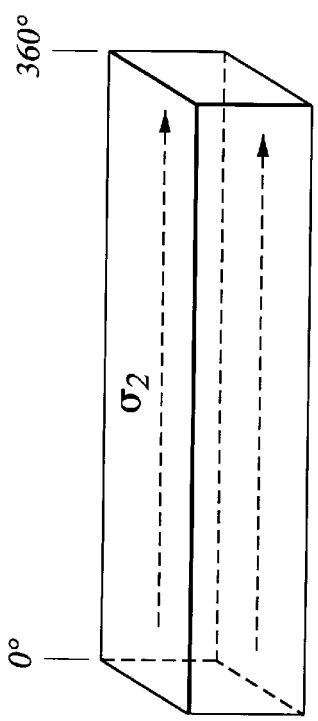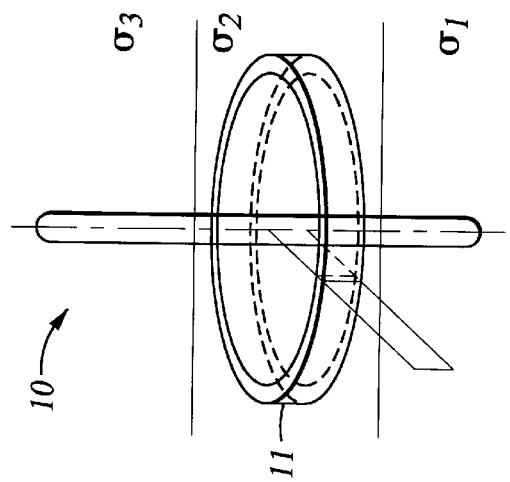
Fig. 3A  Fig. 3B
Fig. 2A  Fig. 2B

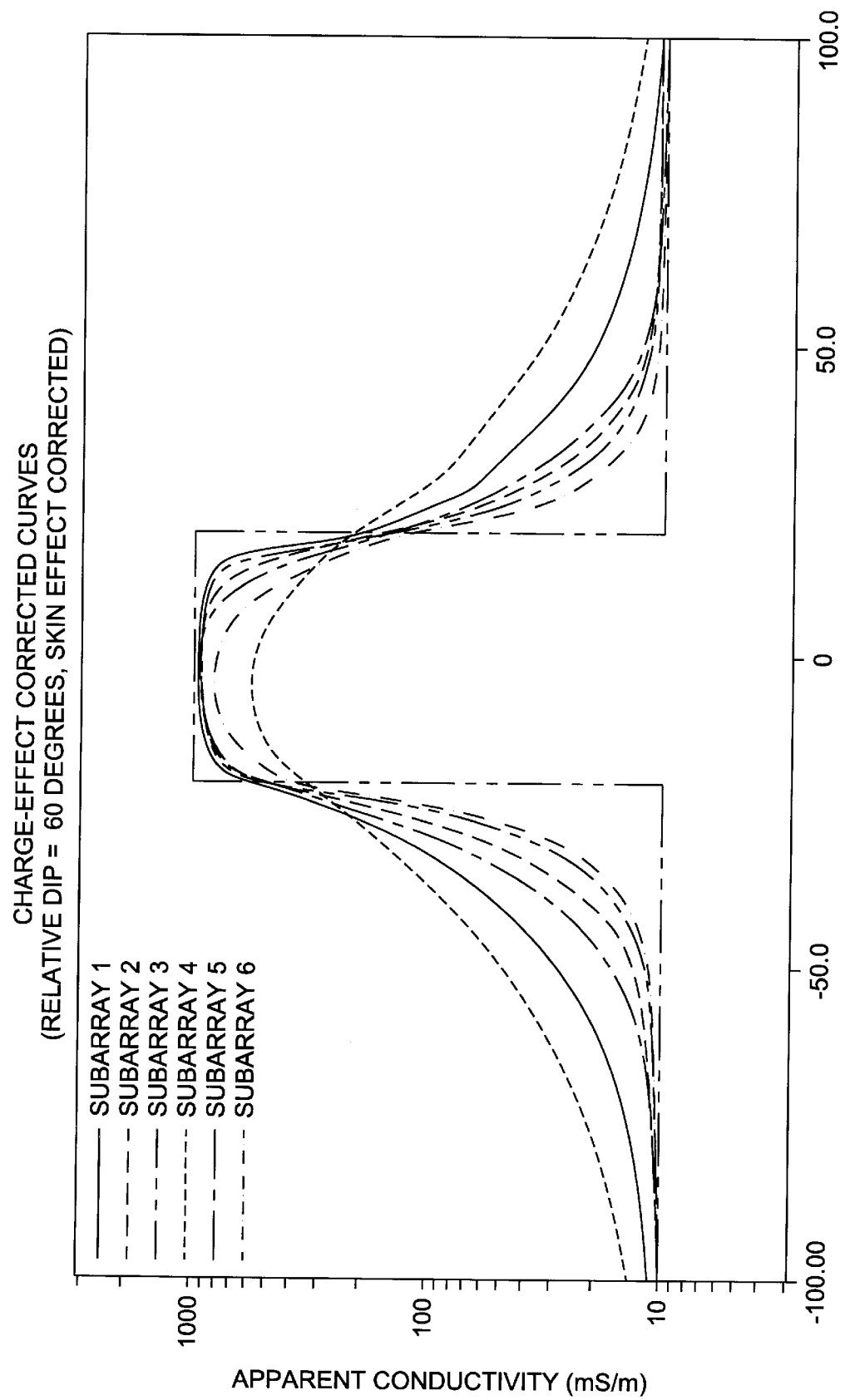

METHOD OF CORRECTING FORMATION RESISTIVITY WELL LOGS FOR THE EFFECTS OF FORMATION LAYER INCLINATION WITH RESPECT TO THE WELLBORE

BACKGROUND OF THE INVENTION

1. Field of the Invention

The present invention is related to the field of electrical resistivity logging of earth formations penetrated by wellbores. More specifically, the present invention is related to methods for correcting electrical resistivity well logs for the effects of apparent formation inclination on these logs.

2. Description of the Related Art

Formation resistivity well logs are commonly used to map subsurface geologic structures and to infer the fluid content within pore spaces of earth formations. Formation resistivity well logs include electromagnetic induction logs. Electromagnetic induction logs typically are measured by an instrument which includes a transmitter through which a source of alternating current (AC) is conducted, and includes receivers positioned at spaced apart locations from the transmitter. The AC passing through the transmitter induces alternating electromagnetic fields in the earth formations surrounding the instrument. The alternating electromagnetic fields induce eddy currents within the earth formations. The eddy currents tend to flow in "ground loops", which are most commonly coaxial with the instrument. The magnitude of the eddy currents can be related to the electrical conductivity (the inverse of the resistivity) of the earth formations. The eddy currents, in turn, induce voltages in the receivers which, generally speaking, are proportional to the magnitude of the eddy currents. Various circuits are provided in the instrument to measure the induced voltages, and thus determine the conductivity (and the resistivity) of the earth formations.

One simplifying assumption which is made in relating the receiver voltage measurements to the conductivity of the earth formations is that the ground loops are positioned entirely within a portion of the earth formation having substantially circumferentially uniform conductivity. This assumption fails in cases where layers of the earth formations are not perpendicular to, but are inclined with respect to, the axis of the wellbore (and consequently the axis of the instrument). A boundary separates two layers which can have different conductivities. As the instrument traverses the wellbore so as to approach one of these boundaries, a portion of one of the ground loops can be located within one layer of the earth formation, and another portion of the same ground loop can be positioned in the other layer having an entirely different conductivity. The eddy current flowing in this ground loop, and consequently the voltage induced in the receivers, will be affected by this occurrence.

A particularly difficult problem arises when the axis of the instrument is not perpendicular to, but is inclined with respect to the formation layers. If the layers are not perpendicular to the axis of the instrument, the conductivity of the media surrounding the instrument can vary circumferentially, causing the inferences about the conductivity from the measurements of induced voltage to be in error. As a practical matter, the effect on the induction resistivity log of inclined formation layers, is the same either when the layers are inclined from horizontal and are penetrated by a vertical wellbore, or when the wellbore itself is inclined from vertical and penetrates substantially horizontal formation layers in the earth formations. What is important in causing the effect of inclined layers is the relative inclination of the layers with respect to the axis of the wellbore, and correspondingly, the axis of the instrument.

Various investigators have attempted to quantify the effect on induction logs of inclined formation layers so that induction logs run under such conditions could be recalculated to represent the measurements that would have been made if the layers were at right angles with respect to the instrument axis. In thus recalculating the well logs, better indications of the actual conductivity (resistivity) of the earth formations could be obtained. For example, in "Theory of Induction Sonde in Dipping Beds", R. Hardman et al, Geophysics, vol. 51, no. 3, pp. 800–809, Society of Exploration Geophysicists (1986), a forward model is described which provides simulated responses of induction logging sondes within media having preselected conductivity, thickness and formation layer inclination with respect to the simulated instrument. Such forward modelling has been improved upon, but in the end still retains a fundamental drawback common to such modelling when used for determining true resistivity from measured data. The simulated values must be compared to the measured values, the difference between them calculated, the model updated, and the process repeated until convergence is achieved between the model and the measured data. This process can be time consuming and difficult to perform, particularly at the wellsite.

An improved method of correcting induction logs for formation layer inclination is described in U.S. Pat. No. 5,184,079 issued to Barber. The method described in the Barber '079 patent includes convolving the apparent resistivity data with an inverse filter to generate corrected resistivity data. The inverse filters are generated by calculating log response functions for models of inclined formation layers for various earth formations. A drawback to the method described in the Barber '079 patent is that the inverse filters are one-dimensional. The one-dimensional filters only correct the response of the induction log for the increased effect of the formation layers axially located above and below the instrument (the so-called "shoulder bed" effect) when the layers are inclined with respect to the instrument. The method disclosed by Barber does not account for the effect of charge buildup which occurs at the boundaries of the layers of the earth formations. This so-called "charge effect" makes up a substantial portion of the total response of induction logs where the boundaries are inclined with respect to the axis of the instrument.

A more complete correction for the response of induction logs for inclined formations layers should take into account the charge effect and a correction for a so-called "volumetric effect". The volumetric effect is partially related to an increase in the shoulder bed effect caused by the relative inclination of the formation layers with respect to the instrument, but the volumetric effect cannot be completely corrected with a one-dimensional filter.

Accordingly it is an object of the present invention to provide a correction method for induction resistivity well logs for formation layer inclination which provides improved performance over the methods of the prior art.

It is another object of the present invention to provide a correction method for induction resistivity well logs for formation layer inclination which quantifies both the charge effect and the volumetric effect on induction logs subject to crossing inclined formation layers.

SUMMARY OF THE INVENTION

The present invention is a method of correcting the response of an induction well logging instrument for the effects of inclination of earth formations with respect to an axis of the instrument. The induction logging instrument has a transmitter and a plurality of receivers at axially spaced apart locations. The method includes calculating expected responses of the receivers on the instrument in simulated media having different conductivities. The step of calculating includes performing the calculation at a plurality of different inclinations of the media with respect to the axis of the instrument. The step of calculating also includes performing the calculation for media having a plurality of conductivity contrasts. The method includes calculating 2-dimensional filters corresponding to a charge effect portion of each one of the simulated responses and calculating 2-dimensional filters corresponding to a volumetric effect portion of each one of the simulated responses. An angle of inclination of the layers of the earth formations with respect to the axis of the instrument is determined. An approximate conductivity contrast of the earth formations is determined. Coefficients are interpolated between ones of the 2-dimensional charge effect filters having simulated inclinations and conductivity contrasts closest to the angle of inclination and conductivity contrast of the earth formations. The interpolated charge effect filter coefficients are applied to measured responses of the instrument. Coefficients are interpolated between ones of the 2-dimensional volumetric effect filters having simulated inclinations and conductivity contrasts closest to the angle of inclination and conductivity contrast of the earth formations, these coefficient are applied to the charge effect filtered measured responses of the instrument to generate corrected responses.

BRIEF DESCRIPTION OF THE DRAWINGS

FIG. 2A shows eddy current ground loops flowing around the tool of FIG. 1 where the layers are perpendicular to the axis of the tool.

FIG. 2B shows a linear perspective of the media through which the ground loop is positioned for the configuration of FIG. 2A.

FIG. 3A shows eddy current ground loops flowing around the tool of FIG. 1 where the layers are inclined with respect to the axis of the tool.

FIG. 3B shows a linear perspective of the media through which the ground loop is positioned for the configuration of FIG. 3A.

FIG. 7A shows the result of application of the charge effect correction filters as shown in FIG. 6A and 6B to a simulated receiver response for a conductive medium inclined at 60 degrees to the axis of the instrument.

DESCRIPTION OF THE PREFERRED EMBODIMENT

Figure 1:
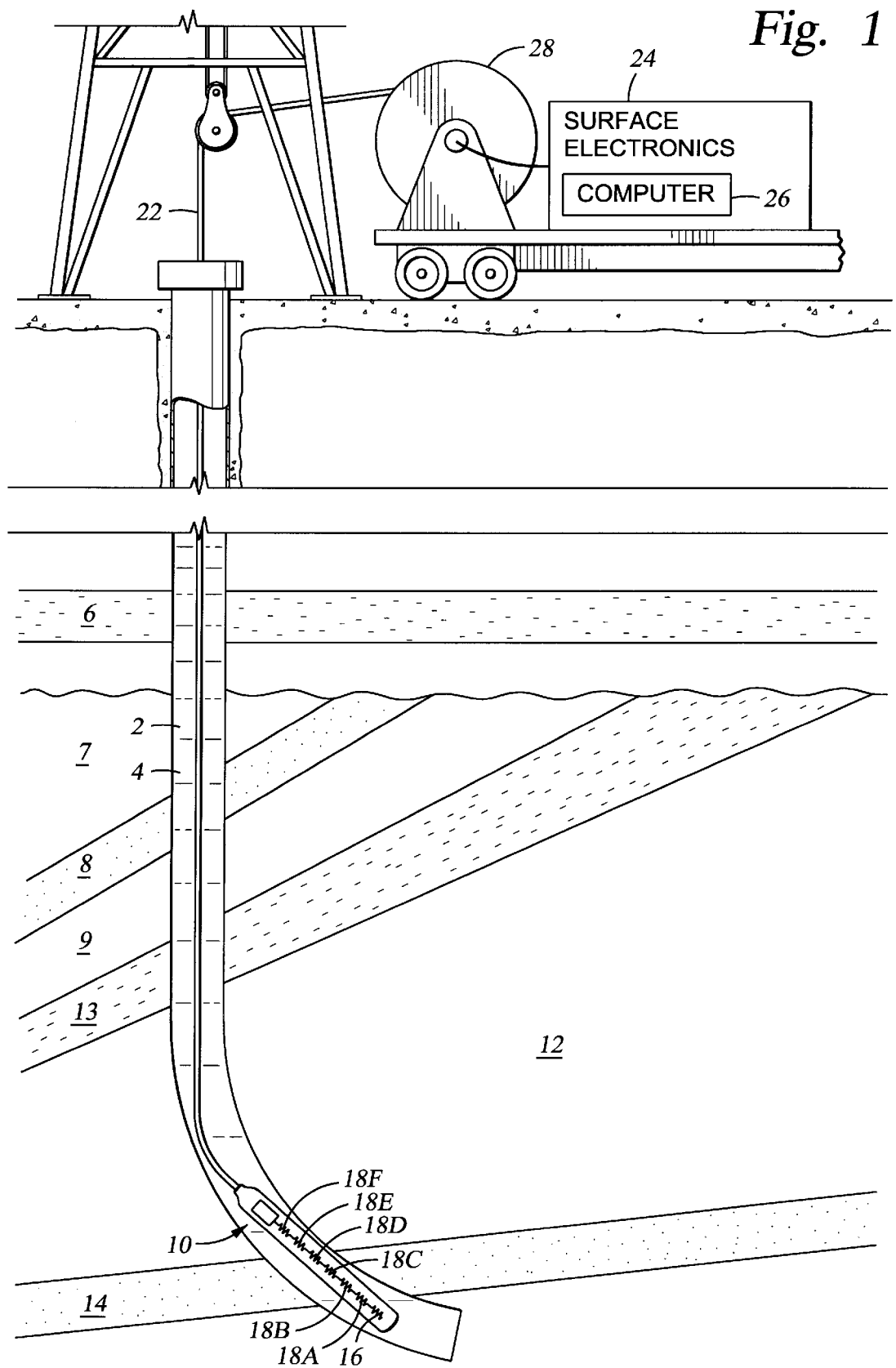
FIG. 1 shows an induction well logging instrument disposed in a wellbore penetrating earth formations having various relative inclinations with respect to the axis of the instrument.

FIG. 1 shows an induction well logging instrument 10 disposed in a wellbore 2 drilled through earth formations. The earth formations are shown generally at 6, 7, 8, 9, 12, 13 and 14. The instrument 10 is typically lowered into the wellbore 2 at one end of an armored electrical cable 22 by means of a winch 28 or similar device known in the art. An induction well logging instrument which will generate appropriate signals for performing the process of the present invention is described, for example, in U.S. Pat. No. 5,452, 761 issued to Beard et al. The instrument described in the Beard et al '761 patent is meant only to serve as an example of, and is not meant to be an exclusive representation of induction well logging instruments which can generate signals usable for performing the process of the present invention.

The instrument described in the Beard et al '761 patent is therefore not to be construed as a limitation on the present invention. The instrument described in Beard et al '761 patent, however, has certain advantages as concerns the method of the present invention which will be further explained.

The instrument 10 can include a telemetry/signal processing unit 20 (SPU).

The SPU 20 can include a source of alternating current (not shown separately). The alternating current is generally conducted through a transmitter 16 disposed on the instrument 10. Receivers 18A–18F can be disposed at axially spaced apart locations along the instrument 10. The SPU 20 can include receiver circuits (not shown separately) connected to the receivers 18A–18F for detecting voltages induced in each of the receivers 18A–18F. The SPU 20 can also impart signals to the cable 22 corresponding to the magnitude of the voltages induced in each of the receivers 18A–18F. It is to be understood that the number of transmitters and receivers, and the relative geometry of the transmitter 16 and the receivers 18A–18F shown in the instrument in FIG. 1 is not meant to be a limitation on the present invention.

As is understood by those skilled in the art, the alternating current passing through the transmitter 16 induces eddy currents in the earth formations 6, 7, 8, 9, 12, 13, 14. The eddy currents correspond in magnitude both to the electrical conductivity of the earth formations 6, 7, 8, 9, 12, 13, 14 and to the relative position of the particular earth formation with respect to the transmitter 16. The eddy currents in turn induce voltages in the receivers 18A–18F, the magnitude of which depends on both the eddy current magnitude and the relative position of the earth formation with respect to the individual receiver 18A–18F.

The signals, corresponding to the voltages induced in each receiver 18A–18F, can be transmitted along the cable 22 to surface electronics 24. The surface electronics 24 can include detectors (not shown separately) for interpreting the signals transmitted from the instrument 10, and a computer 26 to perform the process according to the present invention on the signals transmitted thereto. It is to be understood that the SPU 20 could also be programmed to perform the process of the present invention. Processing the receiver signals in the computer 26 is a matter of convenience for the system designer and is not to be construed as a limitation on the present invention.

The voltages induced in each receiver 18A–18F correspond to apparent electrical conductivity of all of the media surrounding the instrument 10. The media comprise the earth formations 6, 7, 8, 9, 12, 13, 14 and the drilling mud 4 in the wellbore 2. The degree of correspondence between the voltages induced in a particular receiver, and the electrical conductivity of the particular earth formation axially disposed between the particular receiver and the transmitter 16, can depend on the relative inclination of the layers of the earth formations, such as formation 12, and the axis of the instrument 10.

Some of the earth formations, such as the one shown at 6, can be substantially horizontal, but perpendicular to the axis of the wellbore 2 when the wellbore 2 is substantially vertical. Other formations, such as the ones shown at 8 and 9, can be geologically inclined, and inclined with respect to the axis of the wellbore 2 when the wellbore 2 is substantially vertical. Other earth formations, such as 12, can be only slightly geologically inclined, but have high inclination with respect to the axis of the wellbore 2 because the wellbore 2 is itself highly inclined from vertical. It generally does not matter for the purposes of the present invention whether the earth formation is geologically inclined, such as formation 8 and is penetrated by a portion of the wellbore 2 which is substantially vertical, or whether the earth formation is substantially horizontal, such as formation 14 and is penetrated by a portion of the wellbore 2 which is inclined from vertical. For purposes of the present invention, the axis of the instrument 10 is assumed to be substantially coaxial with the wellbore 2. The significance of the formation inclination with respect to the instrument 10 on the instrument 10 response will be further explained.

A particular advantage of the induction logging apparatus disclosed in the Beard et al '761 patent is that it includes six receivers (such as 18A–18F in FIG. 1) each at a different axial spacing from the transmitter. It is to be understood that the number of receivers is not to be construed as a limitation on the invention. A larger number of axially spaced apart receivers can provide improved performance of the process of the present invention, as will be further explained, but the number of receivers may be practically limited by the design considerations of an instrument which would be commercially suitable for use in the wellbore 2.

An apparatus suitable for generating measurements for the present invention having been explained, the theory of operation of the present invention will now be explained in more detail. The electric field vector, represented by E, generated by the transmitter 16 in the induction logging instrument 10 satisfies the following differential equation, wherein the time factor of the current in the transmitter 16 is represented by $e^{-i\omega t}$, and $\omega$ represents the angular frequency of the current in the transmitter 16:

$$\nabla \times \nabla \times E(r) = K^2(r)E(r) + i\omega\mu J(r) \tag{1}$$

In equation (1) r represents the coordinates of an observation point, J(r) represents the electric current density at r, $\mu$ represents the magnetic permeability of the medium (which can include earth formations such as 6, 7, 8, 9, 12, 13, 14) surrounding the instrument 10, and K(r) represents the wavenumber of the medium surrounding the instrument 10 at the observation point r. The wavenumber can be expressed by:

$$K^2(r) = \omega^2 \mu \left[ \epsilon + i\frac{\sigma(r)}{\omega} \right] \tag{2}$$

If the magnetic permeability and the dielectric permittivity (represented by $\epsilon$ in equation (2)) are assumed to be constant (which assumption is reasonable for most earth formations, particularly when energized with alternating current at induction logging frequencies of about 10–150 KHz), the wavenumber substantially represents the conductivity of the medium surrounding the instrument 10. Introducing a notation of a "background" wavenumber (or conductivity), equation (1) can be rewritten in the form:

$$\nabla \times \nabla \times E(r) - K_b^2 E(r) = i\omega\mu J(r) + [K^2(r) - K_b^2]E(r) \tag{3}$$

wherein $K_b$ represents the wavenumber of the background. By incorporating Green's function $g_0(r, r'')$, the solution of equation (3) can be shown by the following expression:

$$E(r) = E_0(r) + \int dr'' g_0(r,r'')[K^2(r'') - K_b^2]E(r'') + \tag{4}$$

$$\frac{\nabla}{K_b^2} \int dr'' g_0(r,r'') \left[ E(r'') \cdot \frac{\nabla[K^2(r'')]}{K^2(r'')} \right]$$

In equation (4), the first term on the right hand side $E_0(r)$, referred to as the incident electric field, can be represented by the following expression:

$$E_0(r) = i\omega\mu \int dr' G_0(r,r')J(r') \tag{5}$$

wherein $G_0(r,r')$ represents the dyadic Green's function. The second term (the first integral with respect to r") on the right hand side of equation (4), as will be further explained, is referred to as the "volumetric" term. The third term (the second integral with respect to r") on the right hand side of equation (4), as will be further explained, is referred to as the "charge" term.

The magnitude of the charge term, as will be further explained, results from buildup of electric charges at the boundary of two layers having different conductivities, through which eddy currents flow when the boundaries are not perpendicular to the axis of the instrument 10. As a practical matter, the instrument 10 is generally substantially coaxial with the wellbore 2, and previous references to the inclination of the earth formations with respect to the axis of the wellbore apply to this description as being with respect to the axis of the instrument 10.

The charge term is substantially equal to zero when the axis of the instrument 10 is substantially perpendicular to the formation layers, because under this condition the electric field vector is typically perpendicular to the directional derivative of the wave number. The charge term, however, can be non-zero when the formation layers are not perpendicular to the axis of the instrument 10. The charge term can be referred to as the "charge-effect" term when the formation layers are inclined with respect to the axis of the instrument 10.

The volumetric term can be different when the instrument 10 axis is inclined with respect to the formation layers than when the instrument 10 axis is perpendicular to these layers. The difference between the volumetric term when the formation layers are perpendicular to the instrument 10 axis, and the volumetric term when the layers are inclined thereto is referred to as the volumetric effect.

As is understood by those skilled in the art, the eddy currents induced in the media surrounding the instrument flow in generally circular ground loops substantially perpendicular to the axis of the instrument 10. When the instrument 10 axis is perpendicular to the earth formations (or layers of media having different electrical conductivities) the ground loops tend to flow within media having circumferentially uniform conductivity. This is not the case when the formations are inclined with respect to the instrument 10 axis. The different formations (media) actually traversed by a particular ground loop can be better understood by referring to FIGS. 2A, 2B, 3A and 3B. FIG. 2A shows the instrument 10 traversing earth formations (media) having conductivities represented by $\sigma_1$, $\sigma_2$ and $\sigma_3$. The formations in FIG. 2A are substantially perpendicular to the axis of the instrument 10. A ground loop 11 corresponding to one of the receivers (18A–18F in FIG. 1) is shown as surrounding the instrument but generally flowing within the formation represented by $\sigma_2$. A linear perspective of the formation through which the ground loop 11 flows can be observed in FIG. 2B.

FIG. 3A shows the instrument disposed within the same three formation layers, but in FIG. 3A the formations are inclined with respect to the axis of the instrument 10. As can be observed in FIG. 3B, the ground loop 11 flows within all three different formations. A linear perspective of the ground loop 11 in FIG. 3A can be observed in FIG. 3B. Eddy currents flowing in ground loop 11 depend on the conductivities of the media $\sigma_1$, $\sigma_2$ and $\sigma_3$ and on electric charge buildup at the boundaries of the media through which the ground loop 11 passes. The amount of charge buildup at each boundary depends on the conductivity contrast between the media on each side of each boundary.

The present invention provides a method for substantially filtering out the charge effect and then determining the magnitude of the volumetric effect of formation layers which are inclined with respect to the axis of the instrument (10 in FIG. 1). The first part of the method includes determining a set of so-called "response functions" for each receiver (such as 18A–18F in FIG. 1) on the instrument (10 in FIG. 1). The term "response function" is more precisely defined as the actual response of each receiver on the instrument to an infinitely thin bed having infinite conductivity (where the product of conductivity and thickness of this bed is unity) interposed within an infinitely thick medium having zero conductivity. This is more commonly known as the "impulse response" of each receiver on the instrument. As a practical matter, however, "impulse" (zero-thickness) earth formations do not exist. It is therefore preferable to simulate the instrument response by designing an appropriate set of "step functions", each of which represents known values of conductivity contrast across a discrete boundary.

Besides being affected by the angle of inclination, the magnitudes of the charge effect and the volumetric effect are affected primarily by the ratio of conductivity (referred to herein as the "conductivity contrast") across the boundary, rather than the absolute magnitudes of the conductivities. Step function responses can be calculated for a number of predetermined inclination angles, and also for a number of different conductivity contrast values at each of these inclination angles.

The first derivative of the instrument response to the step functions can then be calculated. The normalized first derivative represents, in fact, the impulse response of the instrument. For example, a step function of conductivity can be exemplified by formation conductivities which satisfy the following relationship:

$$\sigma_t(z) = \begin{cases} a, & -\infty < z < 0 \\ b, & 0 \leq z < \infty \end{cases} \quad (6)$$

where a and b are arbitrary positive constants representing conductivity values on either side of the boundary and z represents the axial position of the instrument within simulated layers of the media surrounding the instrument. z is usually set to zero at the position of the boundary itself. Using a linear approximation known in the art as the "Doll approximation" for the response of the induction logging instrument (10 in FIG. 1), the instrument 10 response can be expressed as a convolution. More specifically, the instrument 10 response can be represented by the following expression:

$$\sigma_a(z) = \int_{-\infty}^{\infty} \sigma_t(\tau) R(z - \tau) d\tau \quad (7)$$

where R represents the response function of the instrument 10. By substitution of the relationship of equation (6) into the expression of equation (7), an expression for determining the conductivities in terms of the response functions can be shown as:

$$\sigma_a(z) = b \int_{-\infty}^{z} R(t) dt + a \int_{z}^{\infty} R(t) dt \quad (8)$$

The first derivative of the expression in equation (8) provides a solution for the response function R, shown in the following expression as:

$$R(z) = \frac{1}{b - a} \cdot \frac{d[\sigma_a(z)]}{dz} \quad (9)$$

The charge term and the volumetric term of the total response of the instrument are additive, as shown in equation (4). Therefore, the response functions of the instrument 10 to an up-going step function, $R^u(z)$, (meaning that the conductivity increases across the boundary) and to down-going step function, $R^d(z)$, (meaning that the conductivity decreases across the boundary) can be expressed as the sums of the volumetric responses and the charge-effect responses according to the following expressions, first for the up-going response:

$$R^u(z) = R_{vol}(z) + R^u_{chg}(z) \quad (10)$$

and then for the down-going response:

$$R^d(z) = R_{vol}(z) + R^d_{chg}(z) \quad (11)$$

where $R_{vol}(z)$ represents the volumetric response, and $R^d_{chg}(z)$ and $R^u_{chg}(z)$, respectively, represent the up-going and down-going charge-effect responses.

As can be determined from the expression in equation (4), and has been confirmed in the process of generating response models, the up-going and down-going charge-effect responses are substantially equal in magnitude and opposite in sign. Averaging the up-going and down-going instrument responses can therefore provide a direct solution for the volumetric response of the instrument. The volumetric response can then be calculated by the following expression:

$$R_{vol}(z) = \frac{1}{2}\,[R^u(z) + R^d(z)] \qquad (12)$$

The individual up-going and down-going charge-effect response functions can then be obtained by the following expressions:

$$R^u_{chg}(z) = R^u(z) - R_{vol}(z) \qquad (13)$$

$$R^d_{chg}(z) = R^d(z) - R_{vol}(z) \qquad (14)$$

In the present invention, the response functions can be expressed in vector notation to represent a collection of the response functions attributable to each receiver (such as 18A–18F in FIG. 1) on the instrument (10 in FIG. 1). For example:

$$R^u = (R^u_1, R^u_2, \ldots R^u_N),$$

$$R^d = (R^d_1, R^d_2, \ldots R^d_N),$$

$$R_{vol} = (R_{vol1}, R_{vol2}, \ldots R_{volN}) \qquad (15)$$

$$R^u_{chg} = (R^u_{chg1}, R^u_{chg2}, \ldots R^u_{chgN})$$

$$R^d_{chg} = (R^d_{chg1}, R^d_{chg2}, \ldots R^d_{chgN})$$

where 1, 2, ..., N represents the ordinal location of the particular receiver (corresponding to 18A, 18B, ..., 18F in FIG. 1) for which that component of the vector is determined.

Figure 4A:
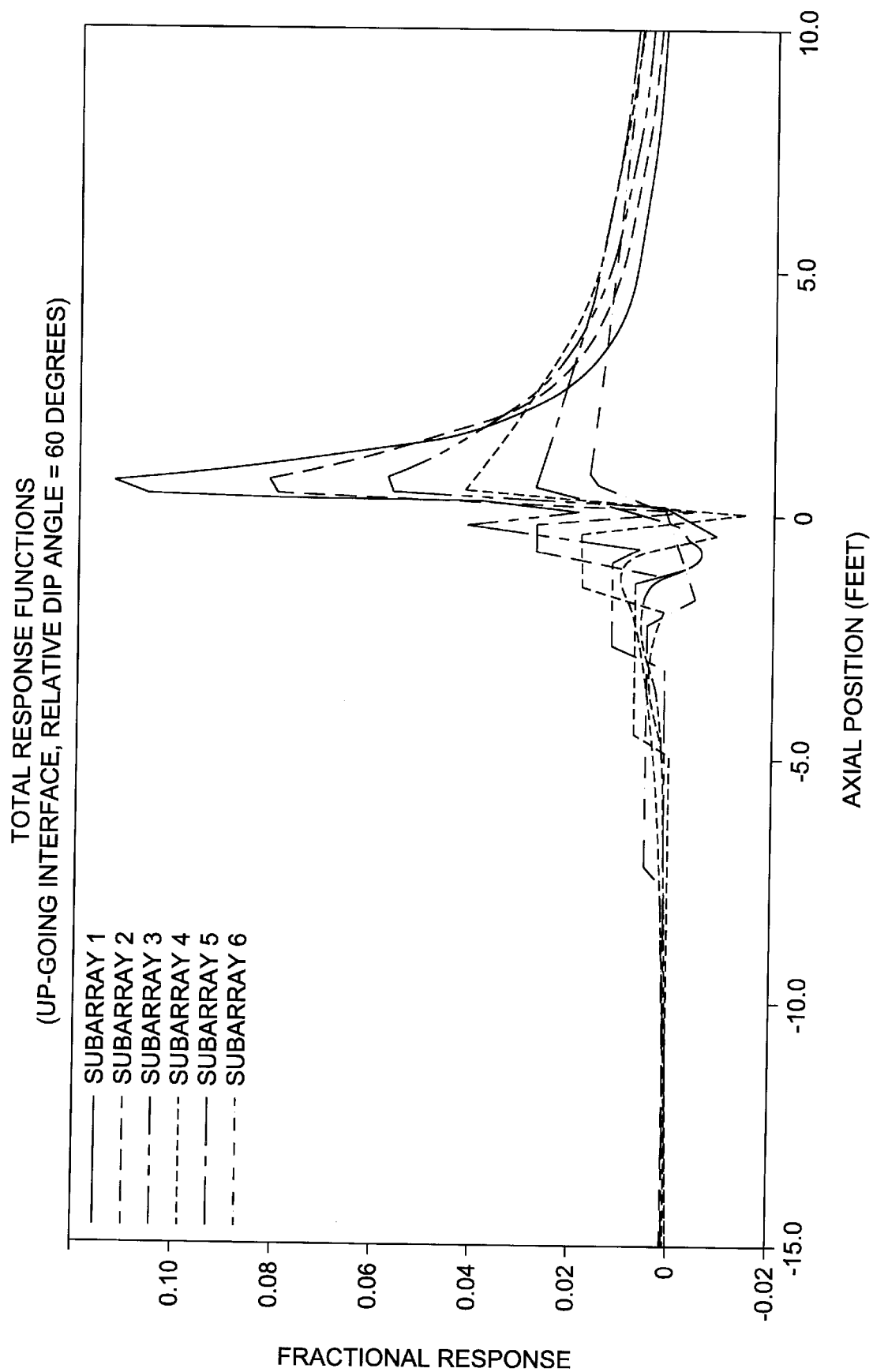
FIG. 4A is a graph of the total response functions of the instrument of FIG. 1 across a simulated up-going boundary having a conductivity contrast of 100 and an inclination angle of 60 degrees.
Figure 4B:
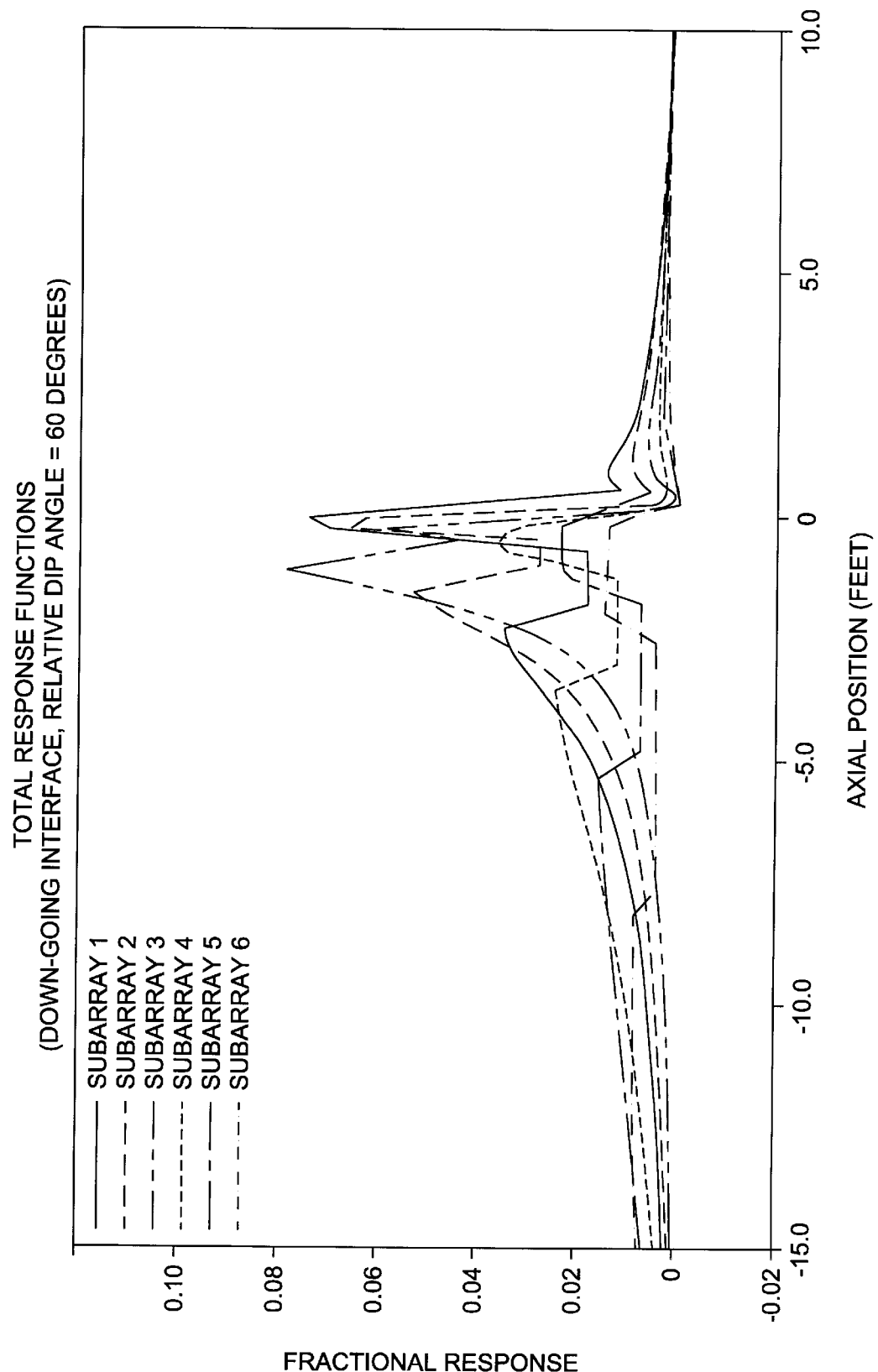
FIG. 4B is a graph of the total response functions for the simulated formations of FIG. 4A but having a down-going boundary.
Figure 4C:
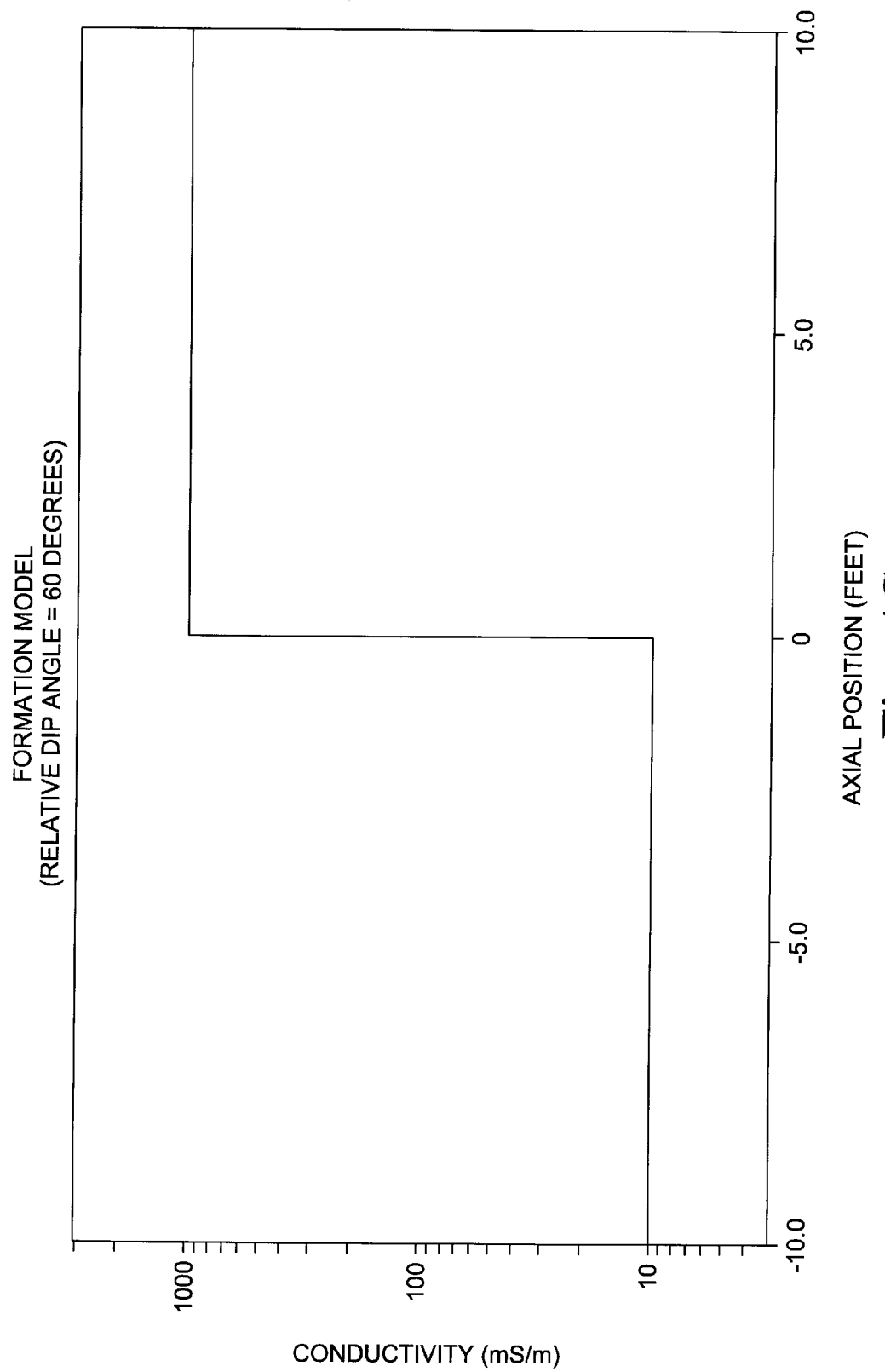
FIG. 4C is a graph of the conductivity values used in the response function simulation shown in FIG. 4A.

Response functions for the instrument of FIG. 1 can be observed by referring to FIGS. 4A and 4B. The graphs in FIGS. 4A and 4B show fractional response of the individual receivers as a function of the axial position of the instrument. The axial position of the boundary is located at zero on the coordinate axis. FIG. 4A represents the step function total response of the instrument of FIG. 1 to an up-going step function having a conductivity contrast of 100. The conductivity values used for the response function calculation in FIG. 4A can be observed by referring to the graph in FIG. 4C.

Figure 4D:
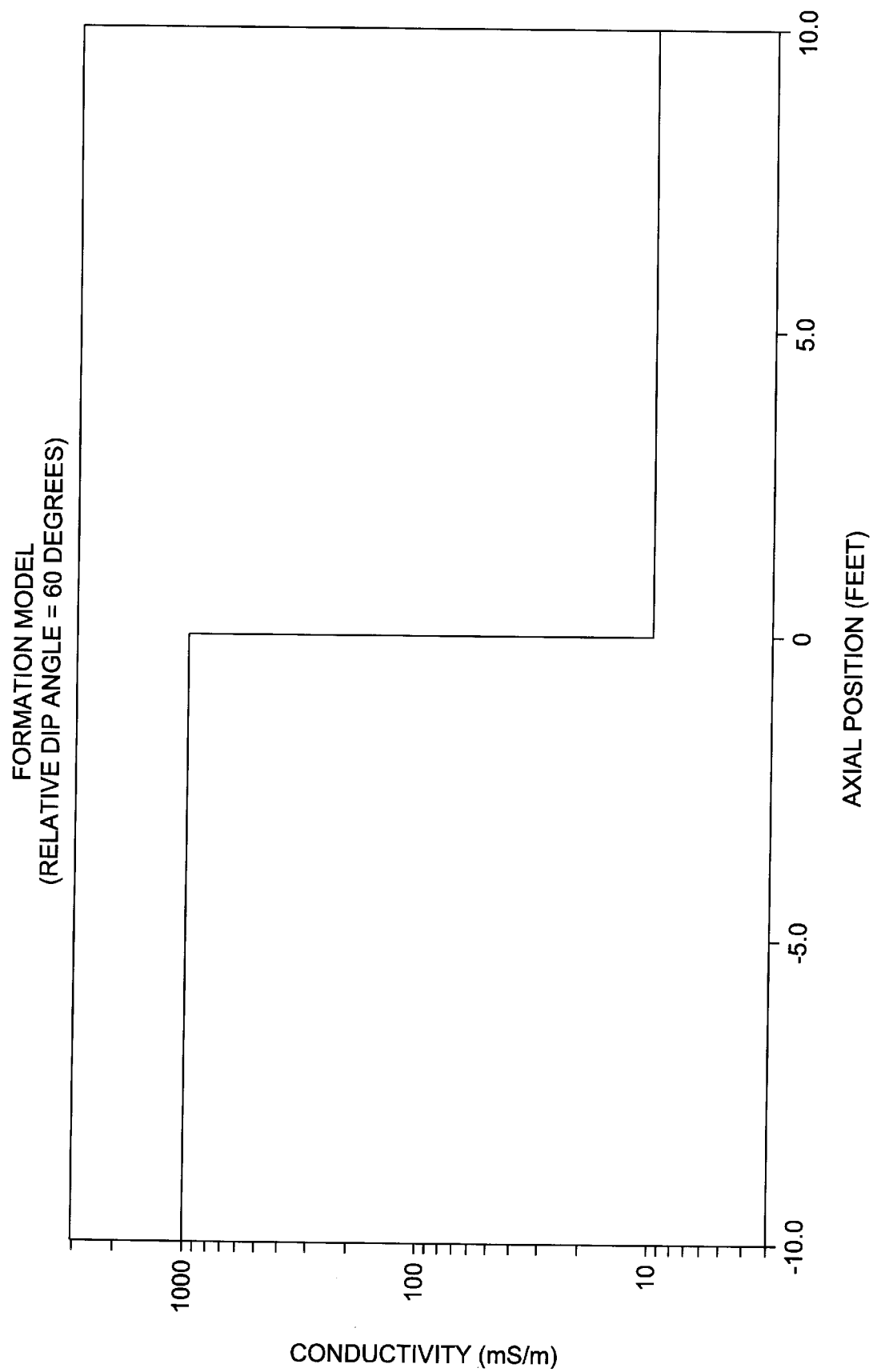
FIG. 4D is a graph of the conductivity values used in the response function simulation shown in FIG. 4B.

FIG. 4B shows the down-going total response of the instrument. The conductivity values used in the response simulation of FIG. 4B can be observed by referring to FIG. 4D.

Figure 5A:
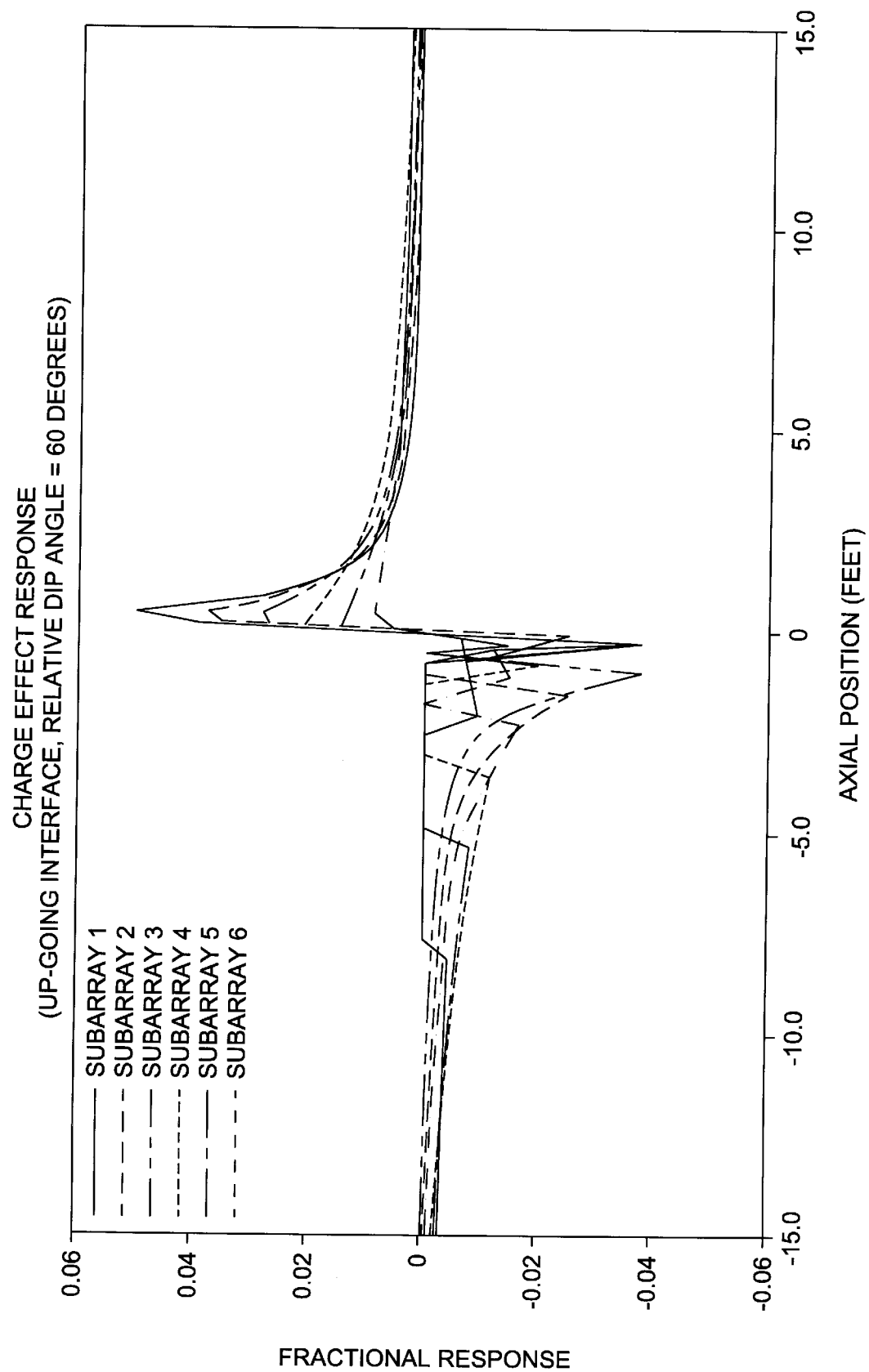
FIG. 5A is a graph of the charge effect component of the response function shown in the graph of FIG. 4A.
Figure 5B:
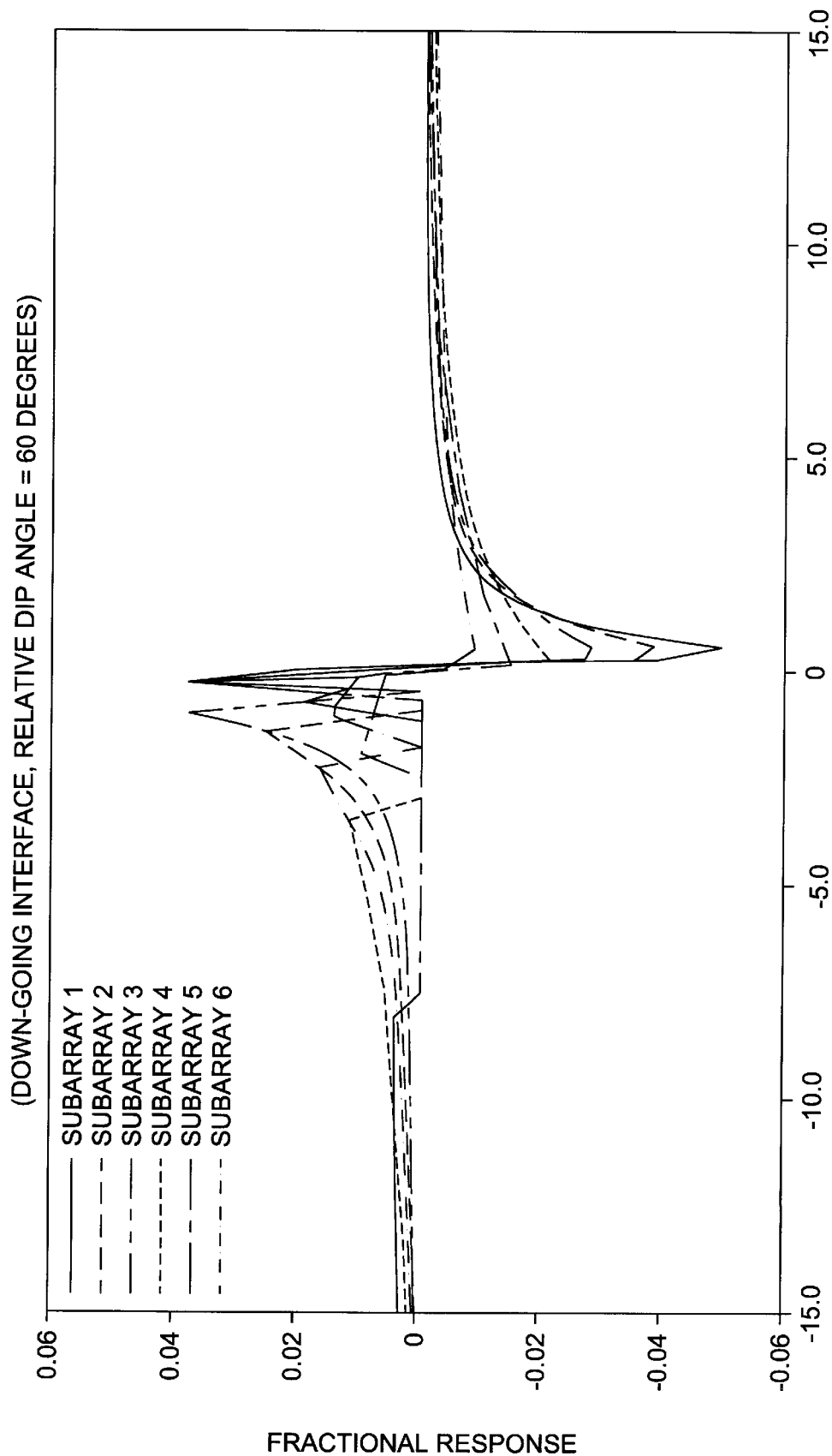
FIG. 5B is a graph of the charge effect component of the response function shown in the graph of FIG. 4B.

The charge effect portion of the total response can be observed for the up-going and the down-going responses, respectively, in the graphs of FIGS. 5A and 5B. The graphs in FIGS. 5A and 5B show the charge effect response of each receiver in the instrument as a function of the axial position of the instrument. The boundary is located at zero on the coordinate axis. FIGS. 5A and 5B show graphically that the charge-effect response for each receiver is opposite in sign and the same amplitude when the conductivities of the media on either side of the boundary are reversed.

The present invention determines, and subsequently substantially removes, the charge effect portion of the total response of the instrument by 2-dimensional (2-D) filtering. Although the charge effect response function is somewhat different for each receiver the charge effect at any one of the receivers can be determined from the responses of the other receivers because all the receiver responses contain charge effects from the same boundary. For example:

$$R^u_{chg} = R^u * F \qquad (16)$$

$$R^d_{chg} = R^d * F \qquad (17)$$

where F represents a collection of 2-D filters, and * represents convolution of the 2-D filter with the response function in the respective equations.

Several constraints for the filter F can be inferred from the relationships expressed in equations (15), (16) and (17), namely:

$$R_{vol} * F = \overline{0} \qquad (18)$$

$$R^u_{chg} * F = R^u_{chg} \qquad (19)$$

By substitution:
where F' can be determined by the expression:

$$R^d_{chg} * F = R^d_{chg} \qquad (20)$$

$$R_{vol} = R^u * F' \qquad (21)$$

$$R_{vol} = R^d * F' \qquad (22)$$

$$F' = \overline{\delta} - F,\ \overline{\delta} = (\delta_1, \delta_2, \ldots, \delta_N) \qquad (23)$$

where $\delta$ represents the 2-dimensional Dirac delta function. Determining F' provides for substantial elimination of the charge effect from the data.

In the present invention, 2-D filters which will substantially remove the charge effect response can be designed by simulation of the response of the instrument for step functions of various conductivity contrast and inclination angle. In the present invention, 2-dimensional filters can be designed for simulations of the instrument response at 0, 10, 20, 30, 40, 50, 60, 70 and 75 degrees. Above about 75 degrees inclination, the analysis of the charge effect and volumetric effect of the present invention becomes somewhat inaccurate. Conductivity contrast values of 10 and 100 can be used for the filter design. The filter coefficients can be solved by an optimization routine such as one described, for example, in "Practical Optimization", P. E. Gill and W. Murray, Academic Press, London, 1981. The routine described in the Gill and Murray reference is a least squares minimization. Since the filters are subject to the constraints described in equations (18) (19) and (20), the process of calculating filter coefficients can be referred to as constrained least squares optimization. It is to be understood that other methods of optimizing the response of the 2-D filters can be used, and that least squares optimization should not be construed as a limitation on the invention.

It is also to be explicitly understood that generating 2-D filters at predetermined inclination angles and conductivity contrasts, and storing such filters in a database for use in calculating corrected induction log responses is provided only as a convenience to the system designer. It is contemplated that response models, and their resultant 2-D filters, could be generated for any selected angle of inclination and any conductivity contrast values, so that a portion of a well log could be adjusted according to the present invention without the need to calculate the 2-D filters beforehand. It is also contemplated that filters could be calculated for the exact angle of inclination and conductivity contrast encountered on the well log for that portion of the well log being recalculated, so that interpolation between the filters at preselected inclination angles and conductivity contrasts is not necessary.

The 2-D charge effect filters thus generated can be stored in a database for use in correcting the response of actual well log data. When actual log data from a wellbore are processed, the 2-D filters in the database can be adjusted by an adaptive algorithm to generate a 2-D filter for a particular portion of the well log data being processed. For example, inclination angle can be provided from external sources, such as dip measuring logs, geologic information, and directional surveys of the wellbore. The filter coefficients can be generated by interpolation between the coefficients of the charge effect filters stored in the database. The conductivity contrast can be selected by sampling a selected axial interval of the well log data, calculating first derivatives of the responses of each one of the receiver responses, and normalizing the calculated derivatives of the responses. Axial segments of receiver responses on either side of the boundaries can be averaged to estimate conductivity on both sides of each boundary. Generally the conductivity contrast selected from the database should be the higher value which most closely matches the contrast calculated for the selected axial interval.

Figure 6A:
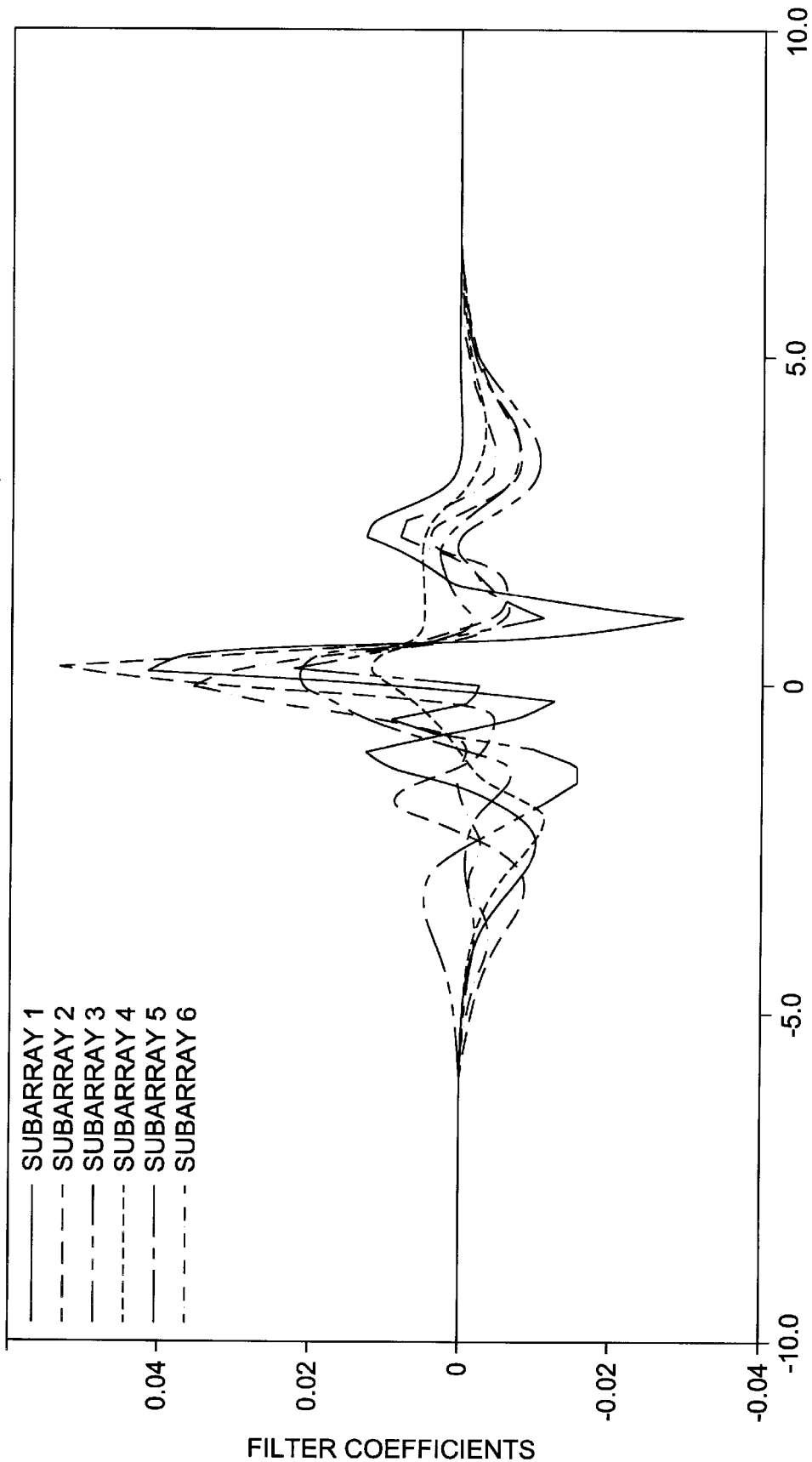
FIG. 6A shows a 2-dimensional filter for the third receiver of the instrument in FIG. 1 for the charge effect correction.
Figure 6B:
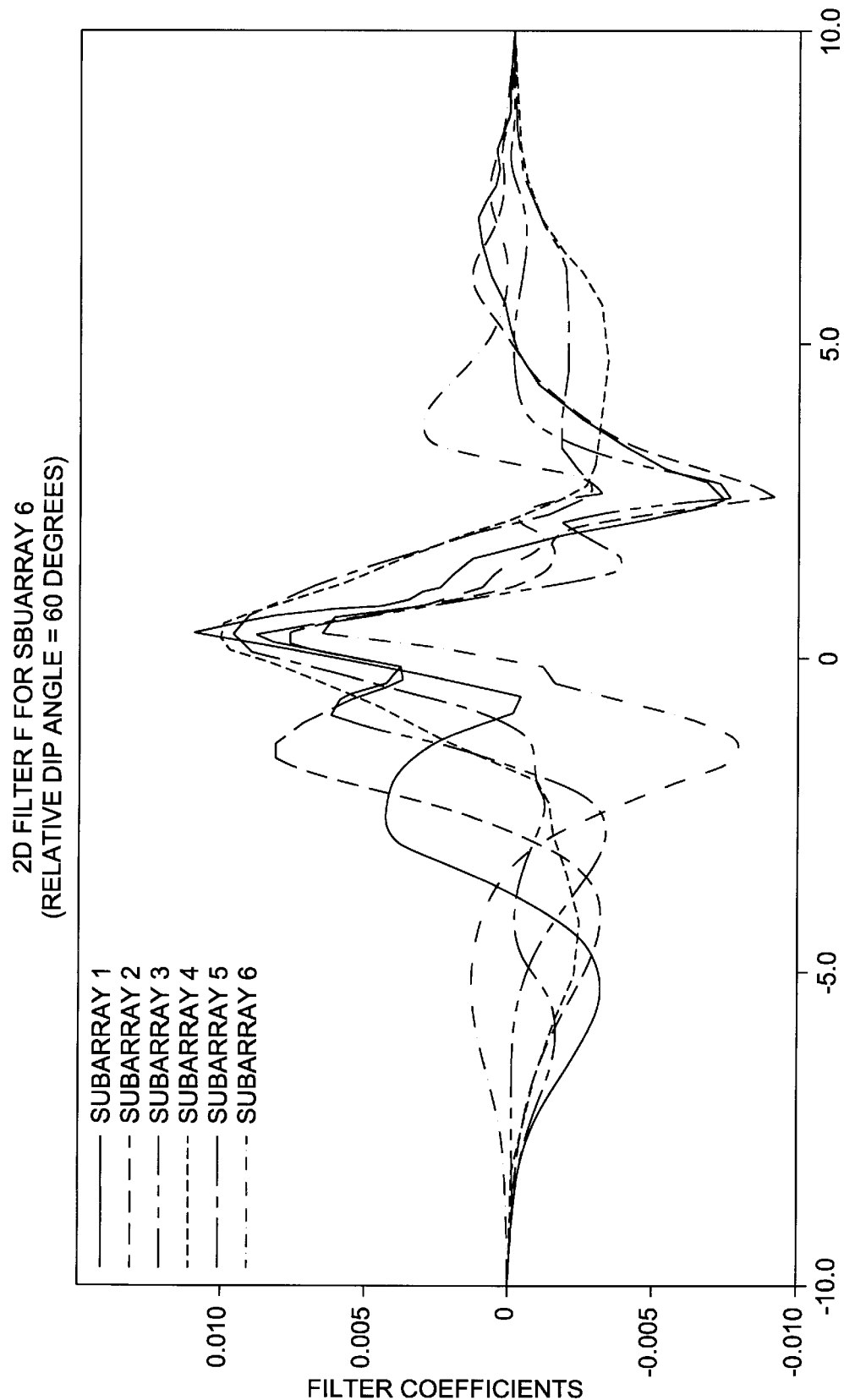
FIG. 6B shows a 2-dimensional filter for the sixth receiver of the instrument in FIG. 1 for the charge effect correction.
Figure 7B:
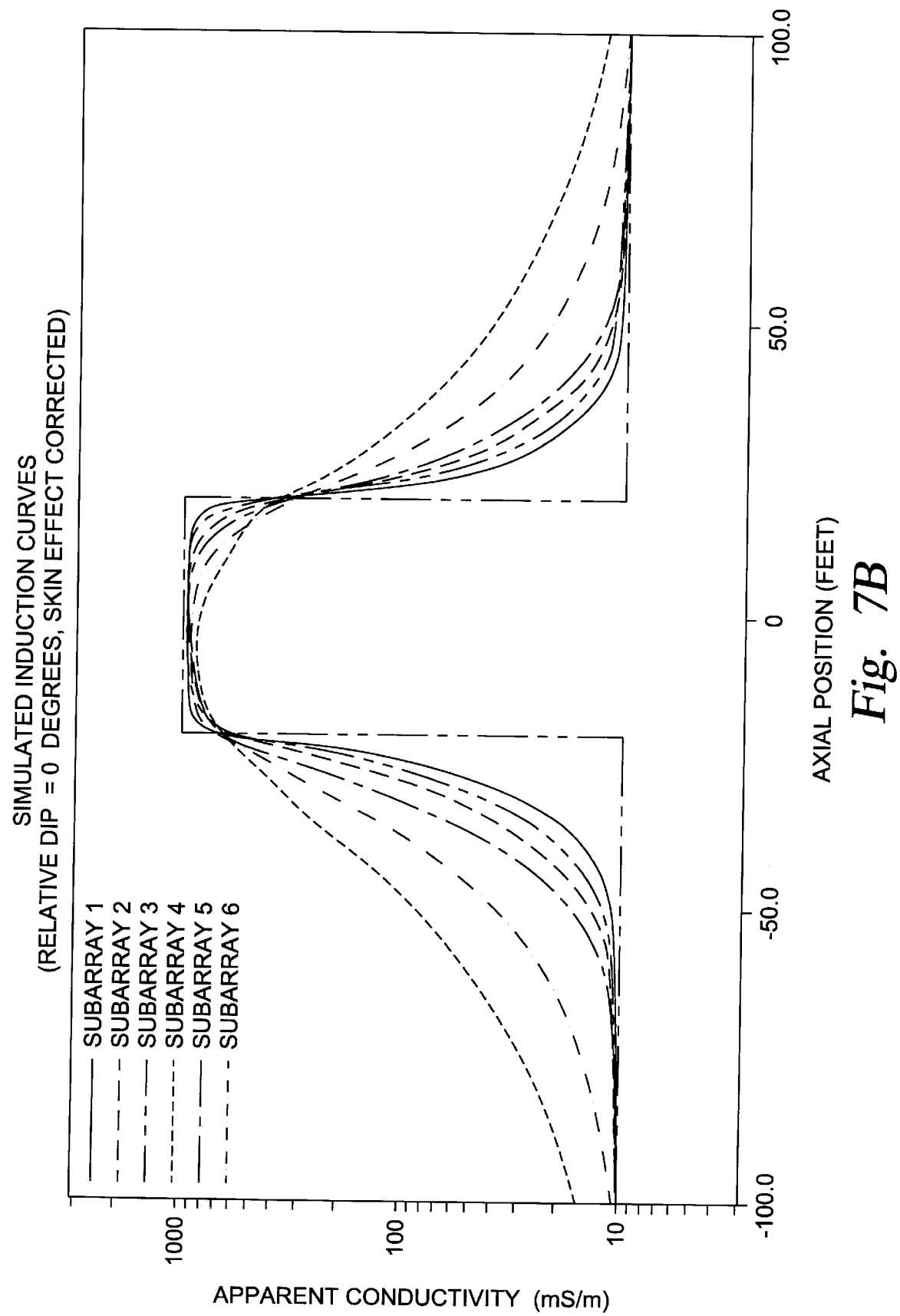
FIG. 7B shows a simulation of receiver responses for the same media as in FIG. 7A, and the layers are perpendicular with respect to the instrument axis.

Examples of 2-D filters corresponding to receivers 18C of FIG. 1 and 18F of FIG. 1 are shown, respectively, in FIGS. 6A and 6B. After application of the 2-D charge effect correction filters, the receiver responses represent responses uncorrected only for the volumetric effect. The volumetric effect at an inclination angle of 60 degrees can be observed by referring to FIGS. 7A and 7B. In FIG. 7A, a simulated conductive layer having a thickness of 40 feet and conductivity of 1 S/m is embedded within a more resistive medium having conductivity of 0.01 S/m. Simulated responses for each of the receivers (18A–18F in FIG. 1) on the instrument are shown for an inclination angle of 60 degrees after application of the charge effect 2-D filter. Simulated receiver responses for the same conductivity media at an inclination angle of zero are shown in FIG. 7B. While there is substantial agreement between the 60 degree and zero degree responses, a further adjustment to the 60 degree response is still warranted. The adjustment which is needed results from the volumetric effect.

Figure 8A:
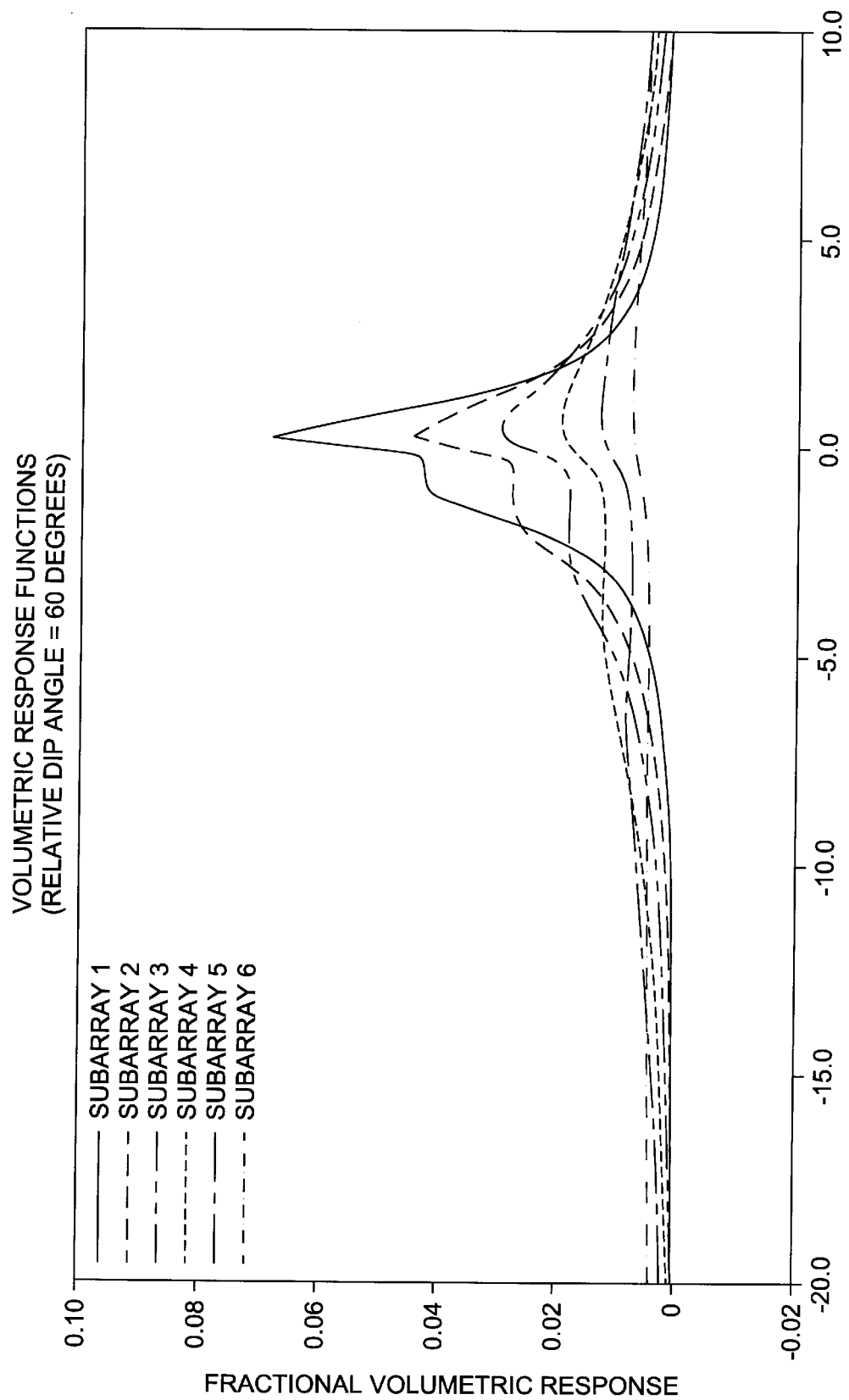
FIG. 8A shows the volumetric component of the total response function at an inclination of 60 degrees.
Figure 8B:
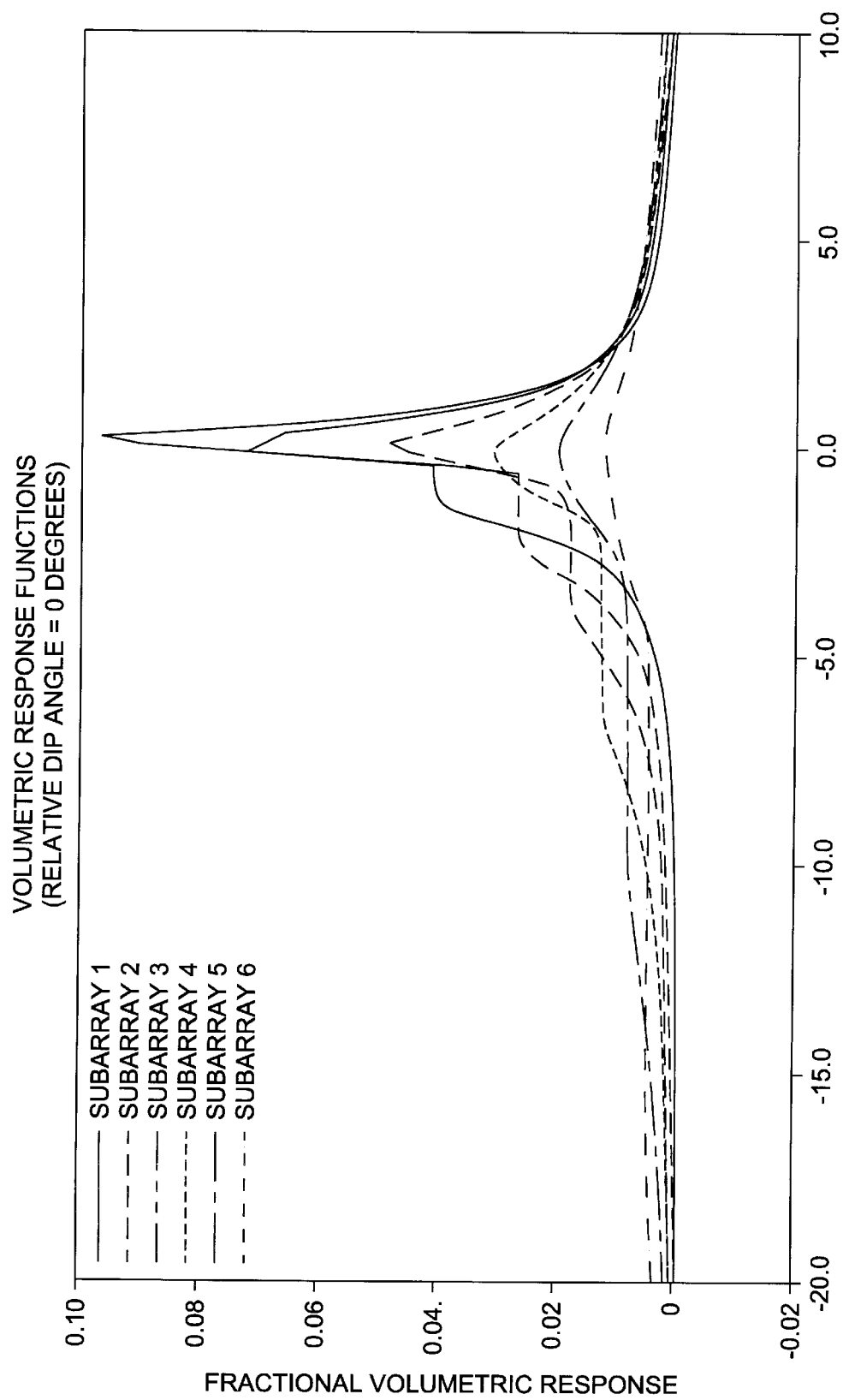
FIG. 8B shows the volumetric component of the total response function with the layers perpendicular to the instrument axis.

The magnitude of the volumetric response can be observed by referring to FIGS. 8A and 8B, which show, respectively, the volumetric responses at inclination angles of 60 and zero degrees for the step function used to generate the total responses as shown in FIGS. 4A and 4B. As previously explained, the volumetric response is not dependent on the direction of travel across the boundary, so there is no need to display up-going and down-going responses. The adjustment for the volumetric response can be provided by another step of 2-D filtering. A 2-D filter for the response of the instrument can be designed so as to make the response shown in FIG. 8A across an inclined boundary substantially match the response of the instrument across a horizontal boundary as shown in FIG. 8B. 2-D filters can be generated and stored in the database corresponding to the same set of boundary inclinations and conductivity contrasts as described for the charge effect filters. The filter coefficients applied to actual well log data at inclinations and contrasts not precisely matching the database values can be generated by interpolation as previously described herein.

Figure 9A:
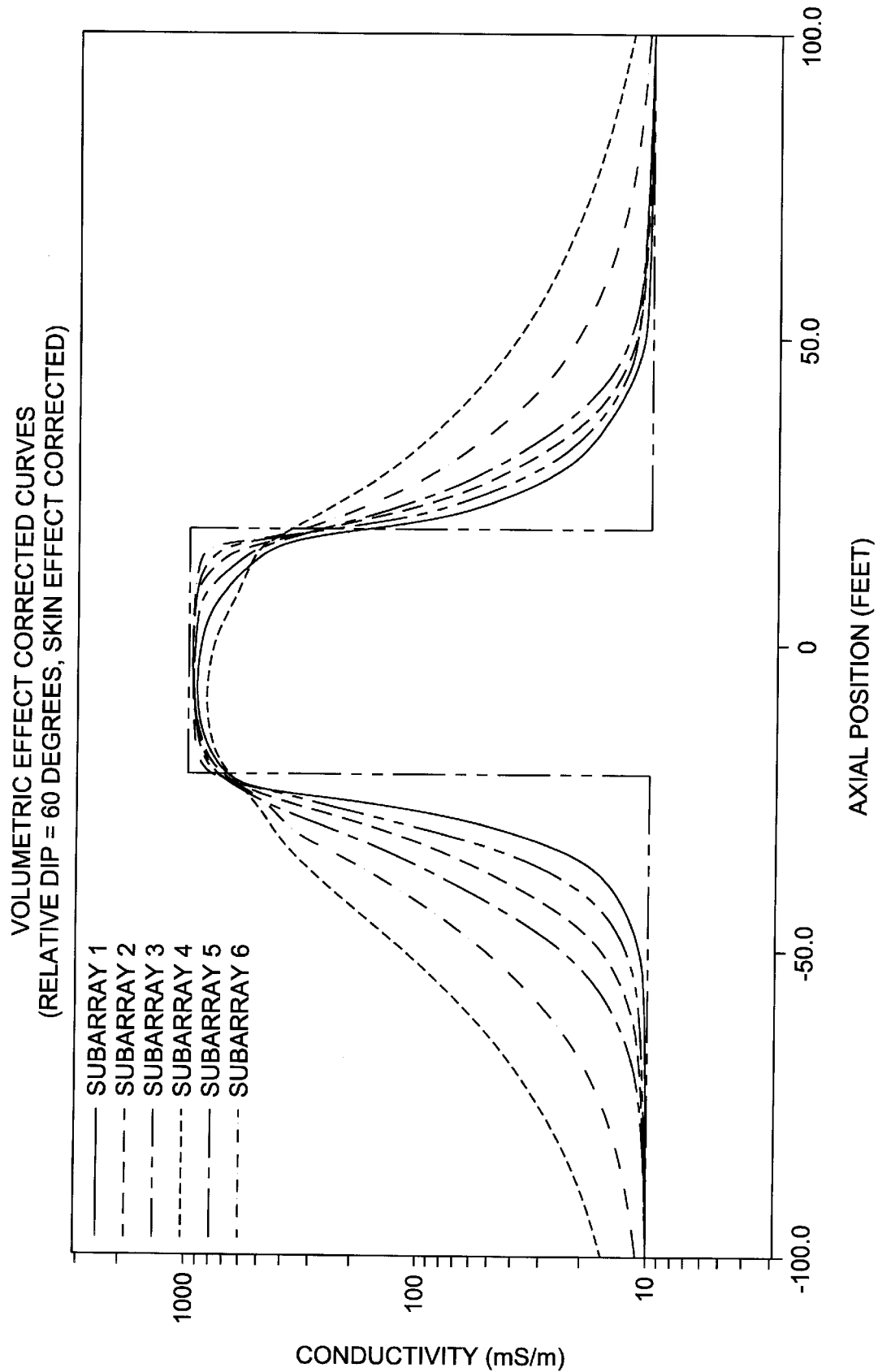
FIG. 9A shows a simulation similar to the one shown in FIG. 7A but includes the volumetric effect correction.
Figure 9B:
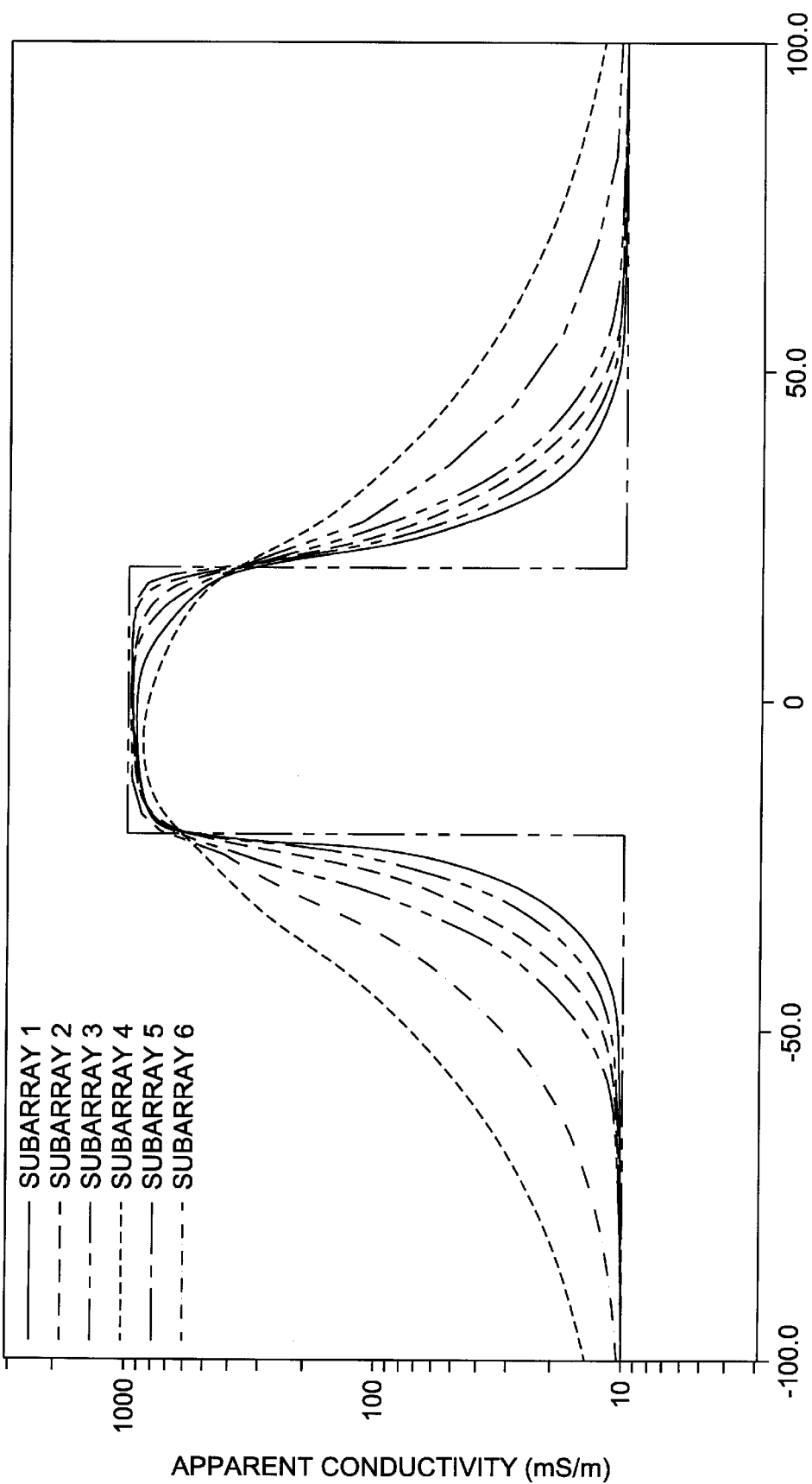
FIG. 9B shows a response of perpendicular layers to compare to the simulated 60 degree response of FIG. 9A.

The improvement in the calculated receiver response after application of the volumetric effect filter can be observed in FIGS. 9A and 9B. FIGS. 9A and 9B are graphs of simulations of receiver responses for the same conductivity media as shown for the graphs in FIGS. 7A and 7B, with FIG. 9A showing volumetric effect corrected response at 60 degrees inclination, and FIG. 9B showing the same receiver responses at zero inclination. FIGS. 9A and 9B show substantial agreement, indicating that the combination of 2-D charge effect and 2-D volumetric effect filters substantially removes the effects of formation layer inclination from the response of the induction instrument.

It is to be understood that 2-D filtering to remove the charge effect and 2-D filtering to remove the volumetric effect can be performed in reverse order, or can be combined into a single step of filtering because the volumetric effect and the charge effect are additive, as described in equation (4).

The description of the invention provided herein is meant only to serve as an example of a method of correcting induction logs for the effects of formation layer inclination. Those skilled in the art will readily devise other embodiments of the method which do not depart from the spirit of the invention. Accordingly, the invention should only be limited in scope by the attached claims.

What is claimed is:

1. A method for correcting response of an induction well logging instrument for effects of inclination of earth formations with respect to an axis of said instrument, said instrument having a transmitter and a plurality of receivers at spaced apart locations, said method comprising:

calculating expected responses of said receivers in simulated media each having a different conductivity, said step of calculating performed for a plurality of different inclinations of said media with respect to said axis of said instrument, said step of calculating performed for a plurality of different conductivity contrasts between said media;

calculating 2-dimensional filters corresponding to a charge effect portion of each of said expected responses;

calculating 2-dimensional filters corresponding to a volumetric effect portion of each of said expected responses;

determining an angle of inclination with respect to said axis of said instrument of said earth formations;

determining an approximate conductivity contrast of said earth formations;

interpolating coefficients between ones of said 2-dimensional charge effect filters having simulated inclinations and conductivity contrasts closest to said angle of inclination and said approximate conductivity contrast of said earth formations;

applying said interpolated charge effect coefficients to measured responses of said instrument, thereby generating charge effect-filtered measured responses;

interpolating coefficients between ones of said 2-dimensional volumetric effect filters having simulated inclinations and conductivity contrasts closest to said angle of inclination and said conductivity contrast of said earth formations; and applying said interpolated volumetric effect filter coefficients to said charge effect-filtered measured responses thereby generating corrected responses.

2. The method as defined in claim 1 wherein said step of calculating said 2-dimensional filters corresponding to said charge effect comprises constrained least squares optimization.

3. The method as defined in claim 1 wherein said step of calculating said 2-dimensional filters corresponding to said volumetric effect comprises constrained least squares optimization.

4. The method as defined in claim 1 wherein said step of determining said approximate conductivity contrast of said earth formations comprises calculating derivatives of said measured responses with respect to axial position of said instrument and normalizing said derivatives over a selected portion of said measured responses.

5. The method as defined in claim 1 wherein said 2-dimensional filters corresponding to said charge effect satisfy constraints, comprising:

convolution of said 2-dimensional charge effect filter with an up-going charge effect response of said instrument yields substantially zero response;

convolution of said charge effect filter with a down-going charge effect response of said instrument yields substantially zero response; and convolution of said charge effect filter with said volumetric effect response of said instrument substantially yields said volumetric response.

6. A method of determining conductivity of earth formations penetrated by a wellbore, comprising:

inserting an induction logging instrument into said wellbore, said instrument comprising a transmitter, a source of alternating current and a plurality of receivers at axially spaced apart locations along said instrument;

moving said instrument along said wellbore;

energizing said transmitter with said source of alternating current;

receiving induction signals at said receivers;

calculating expected responses of said receivers in simulated media each having a different conductivity, said step of calculating performed for a plurality of different inclinations of said media with respect to an axis of said instrument, said step of calculating performed for said media having a plurality of different conductivity contrasts therebetween;

calculating 2-dimensional filters corresponding to a charge effect portion of each of said expected responses;

calculating 2-dimensional filters corresponding to a volumetric effect portion of each of said expected responses;

determining an angle of inclination of said earth formations with respect to said axis of said instrument;

determining approximate conductivity contrasts between said earth formations from said induction signals;

interpolating coefficients between ones of said 2-dimensional charge effect filters having simulated inclinations and conductivity contrasts closest to said angle of inclination and said conductivity contrasts between said earth formations;

applying said interpolated charge effect filter coefficients to said induction signals, thereby generating charge effect-filtered induction signals;

interpolating coefficients between ones of said 2-dimensional volumetric effect filters having simulated inclinations and conductivity contrasts closest to said angle of inclination and said approximate conductivity contrast of said earth formations; and applying said interpolated volumetric effect filter coefficients to said charge effect-filtered induction signals thereby generating volumetric effect-filtered induction signals; and determining said conductivity of said earth formations from said volumetric effect-filtered induction signals.

7. The method as defined in claim 6 wherein said step of calculating said 2-dimensional filters corresponding to said charge effect comprises constrained least squares optimization.

8. The method as defined in claim 6 wherein said step of calculating said 2-dimensional filters corresponding to said volumetric effect comprises constrained least squares optimization.

9. The method as defined in claim 6 wherein said step of determining said approximate conductivity contrast of said earth formations comprises calculating derivatives of said induction signals with respect to axial position of said instrument and normalizing said derivatives over a selected portion of said induction signals.

10. The method as defined in claim 6 wherein said 2-dimensional filters corresponding to said charge effect satisfy constraints, comprising:

convolution of said 2-dimensional charge effect filter with an up-going charge effect response of said instrument yields substantially zero response;

convolution of said charge effect filter with a down-going charge effect response of said instrument yields substantially zero response; and convolution of said charge effect filter with said volumetric effect response of said instrument substantially yields said volumetric response.

11. A method for correcting responses of an induction well logging instrument for effects of inclination of earth formations with respect to an axis of said logging instrument, said instrument having a transmitter and a plurality of receivers at axially spaced apart locations, said method comprising:

determining an angle of inclination of said formations;

determining conductivity contrasts between said earth formations;

determining a charge effect component of said responses;

filtering said responses to substantially remove said charge effect component;

determining a volumetric effect component of said responses;

filtering said charge effect-inverse-filtered responses to substantially remove said volumetric effect, thereby generating corrected responses.

12. The method as defined in claim 11 wherein said step of determining said charge effect component comprises:

simulating response of said instrument to a stair step of simulated media having a simulation conductivity contrast and a simulation inclinations substantially the same as said angle of inclination and said conductivity contrast of said earth formations;

averaging up-going and down-going responses to generate a volumetric response;

determining a filter for correcting said volumetric response; and determining a filter for correcting said charge effect response.

13. The method as defined in claim 11 wherein said filter for correcting said charge effect satisfies constraints, comprising:

convolution of said charge effect filter with an up-going charge effect response of said instrument yields substantially zero response;

convolution of said charge effect filter with a down-going charge effect response of said instrument yields substantially zero response; and convolution of said charge effect filter with said volumetric effect response of said instrument substantially yields said volumetric response.

* * * * *